United States Patent
Hoshiyama

(10) Patent No.: US 8,963,003 B2
(45) Date of Patent: Feb. 24, 2015

(54) UNDERWATER APPARATUS

(71) Applicant: Fujitsu Limited, Kawasaki-shi, Kanagawa (JP)

(72) Inventor: Naoto Hoshiyama, Tama (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 13/644,977

(22) Filed: Oct. 4, 2012

(65) Prior Publication Data
US 2013/0092433 A1 Apr. 18, 2013

(30) Foreign Application Priority Data
Oct. 14, 2011 (JP) ................................. 2011-227313

(51) Int. Cl.
*H02G 15/14* (2006.01)
*H02G 11/00* (2006.01)

(52) U.S. Cl.
CPC ............... *H02G 15/14* (2013.01); *H02G 11/00* (2013.01)
USPC ...... 174/70 S; 174/68.1; 174/68.3; 174/71 R; 174/72 R; 174/74 R; 385/50; 385/100; 385/138; 385/147; 405/150; 405/160; 405/166

(58) Field of Classification Search
CPC .... H02G 15/14; H01R 13/523; H01R 13/631; H01R 13/6335
USPC ........ 174/71 R, 72 R, 70 S, 73.1, 74 R, 75 D, 174/84 R, 86, 570, 68.1, 68.3, 72 A; 385/53, 385/100, 138, 147; 405/158, 160, 166–170
See application file for complete search history.

(56) References Cited

U.S. PATENT DOCUMENTS

| | | | |
|---|---|---|---|
| 3,349,169 A * | 10/1967 | Donadieu | 174/128.1 |
| 6,290,399 B1 * | 9/2001 | Ogiya | 385/53 |
| 6,424,761 B1 * | 7/2002 | Kordahi et al. | 385/25 |
| 6,672,801 B2 * | 1/2004 | Hayakawa et al. | 405/158 |
| 7,933,165 B2 * | 4/2011 | Thompson et al. | 367/20 |
| 2002/0168231 A1 * | 11/2002 | Hayakawa et al. | 405/158 |
| 2003/0198027 A1 * | 10/2003 | Takeda et al. | 361/728 |

FOREIGN PATENT DOCUMENTS

JP 6-186345 7/1994

OTHER PUBLICATIONS

French Search Report Issued on Aug. 13, 2013 in corresponding French Application No. 1259743.

* cited by examiner

*Primary Examiner* — Ishwarbhai B Patel
*Assistant Examiner* — Paresh Paghadal
(74) *Attorney, Agent, or Firm* — Staas & Halsey LLP

(57) ABSTRACT

There is provided an underwater apparatus that includes a housing including a certain device, a pair of cable couplings including gimbals through which tail cables extends from the device to the outside of the housing pass, and the pair of cable couplings that connect the tail cables passing through the gimbals to a submarine cable, and a connecting holder configured to include gimbal rings fitted to the gimbals and to connect the pair of cable couplings to the housing via the gimbal rings so that the pair of cable coupling is rotatable relative to the housing, the connecting holder including an opening from which the gimbals are introduced toward the gimbal rings, wherein the connecting holder includes notches provided in an edge of the opening and the notches are formed so that the pair of cable coupling is rotatable relative to the housing.

7 Claims, 11 Drawing Sheets

UNDERWATER APPARATUS

CROSS-REFERENCE TO RELATED APPLICATION

This application is based upon and claims the benefit of priority of the prior Japanese Patent Application No. 2011-227313, filed on Oct. 14, 2011, the entire contents of which are incorporated herein by reference.

FIELD

The embodiment discussed herein is related to underwater apparatuses.

BACKGROUND

An apparatus is known which includes a branched submarine cable under the sea. FIG. 10 is a partial sectional view of the underwater apparatus according to the related art. The related-art underwater apparatus illustrated in FIG. 10 includes a housing 110, a pair of cable couplings 120, and a connecting holder 130.

The housing 110 is a pressure-resistant container that accommodates devices, such as a power supply and an amplifier. To one end of the housing 110 is connected a cable coupling 140 that connects tail cables 111 extending from the devices in the housing 110 and a main-side submarine cable 140a. The cable couplings 120 include gimbals 122 through which the tail cables 111 extending from the devices in the housing 110 pass. The cable couplings 120 connect the tail cables 111 extending through the gimbals 122 and branch-side submarine cables 120a. The connecting holder 130 includes gimbal rings 131 fitted to the gimbals 122. The connecting holder 130 connects the pair of cable couplings 120 and the housing 110 so as to be rotatable with respect to each other via the gimbal rings 131.

The conventional connecting holder 130 includes two openings 132 from which the gimbals 122 are introduced toward the gimbal rings 131. These openings 132 each includes a space 132a in which the tail cable 111 passing through the gimbal 122 may move.

Japanese Laid-open Patent Publication No. 6-186345 is an example of related art.

SUMMARY

According to an aspect of the invention, an underwater apparatus includes a housing configured to accommodate a certain device, a pair of cable couplings configured to include gimbals through which tail cables extending from the device to the outside of the housing pass, and the pair of cable couplings that connect the tail cables passing through the gimbals to a submarine cable, and a connecting holder configured to include gimbal rings fitted to the gimbals and to connect the pair of cable couplings to the housing via the gimbal rings so that the pair of cable coupling is rotatable relative to the housing, the connecting holder including an opening from which the gimbals are introduced toward the gimbal rings, wherein the connecting holder includes notches provided in an edge of the opening and the notches are formed by retreating the edge of the opening in directions away from the gimbals so that the pair of cable coupling is rotatable relative to the housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

However, the related-art underwater apparatus includes a potential problem in that the gimbals of the cable couplings may be damaged when the underwater apparatus is picked up.

Figure 11:
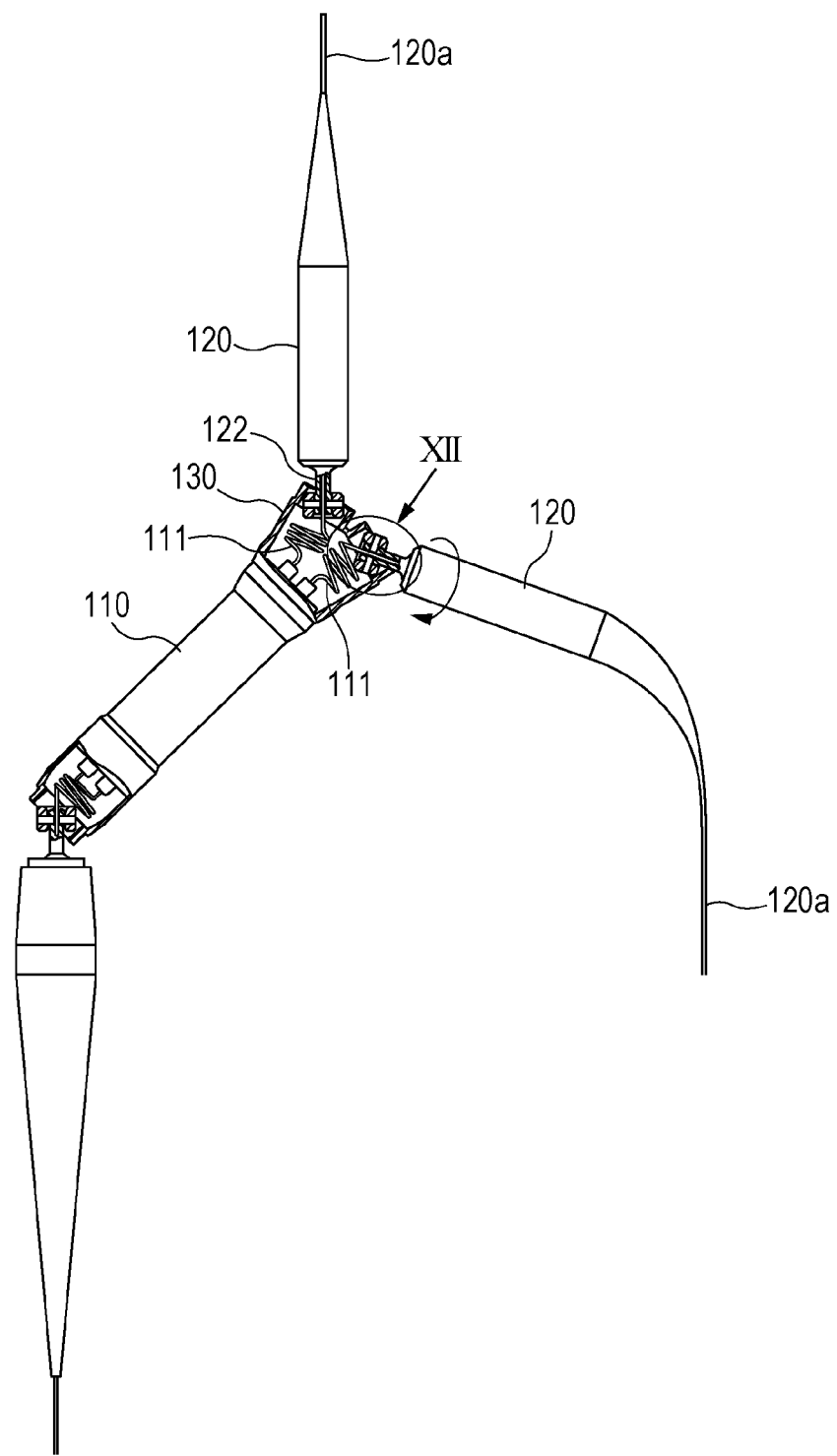
FIG. 11 illustrates the related-art underwater apparatus while being hoisted.
Figure 12:
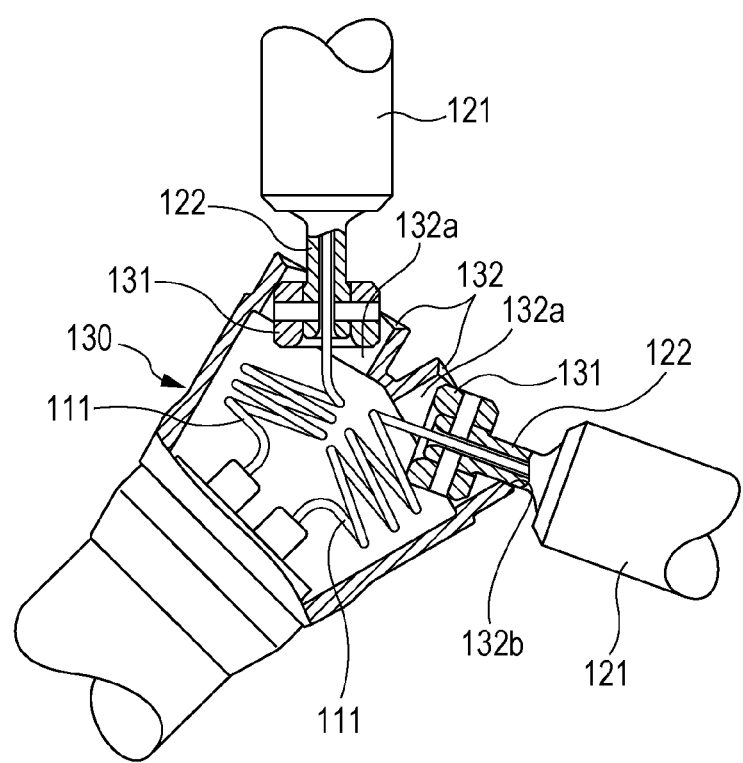
FIG. 12 is an enlarged view of a part XII in FIG. 11.

Problems in the related art will be described using FIGS. 11 and 12. FIG. 11 illustrates the related-art underwater apparatus while being picked up. FIG. 12 is an enlarged view of a part XII in FIG. 11. FIG. 11 illustrates a case where one of the pair of cable couplings 120 is hoisted when the underwater apparatus is collected or hoisted. At this time, the other cable coupling 120 rotates in the direction indicated by an arrow in FIG. 11 with respect to the housing 110 due to the weights of its own and the submarine cable. As the other cable coupling 120 rotates, the gimbal 122 thereof moves in the space 132a in the opening 132 provided in the connecting holder 130 and collides with an edge 132b of the opening 132 in the connecting holder 130, as illustrated in FIG. 12. As a result, the gimbal 122 of the other cable coupling 120 may be damaged.

The technology disclosed herein has been made in view of the above, and an object thereof is to provide an underwater apparatus that may suppress damage to a gimbal of a cable coupling when the underwater apparatus is hoisted.

An embodiment of an underwater apparatus disclosed herein will be described in detail below with reference to the drawings. Note that the disclosed technology is not limited by the following embodiment.

Embodiment

Figure 1:
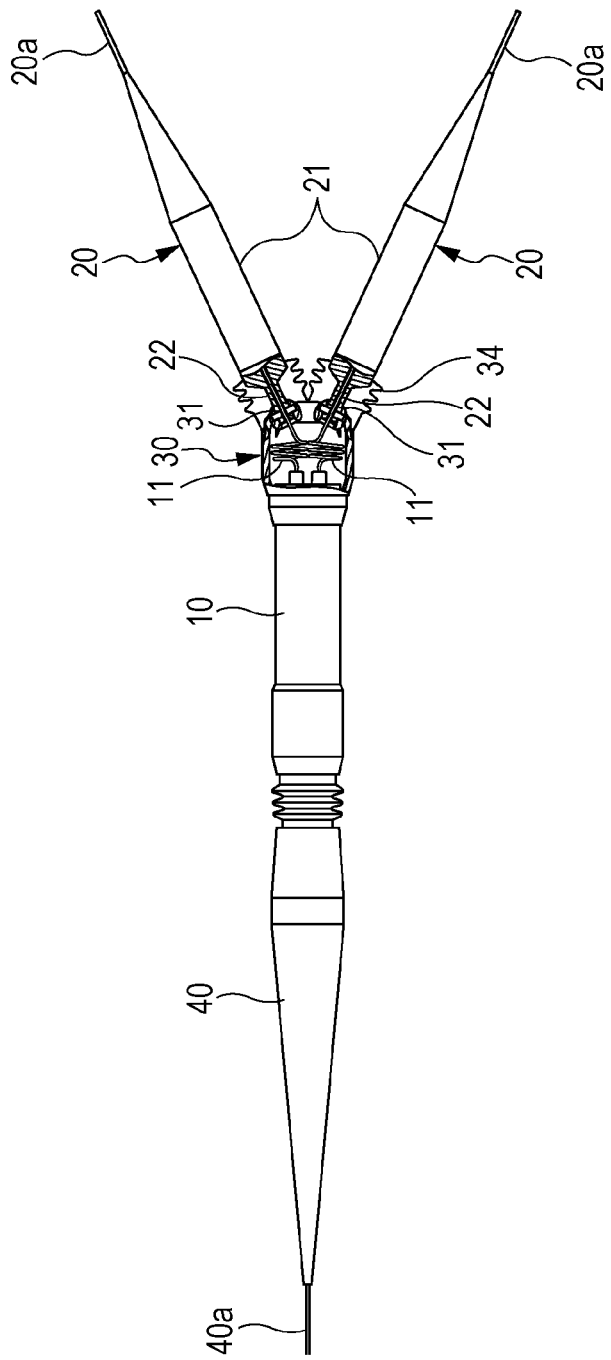
FIG. 1 is a partial sectional view of an underwater apparatus according to this embodiment.
Figure 2:
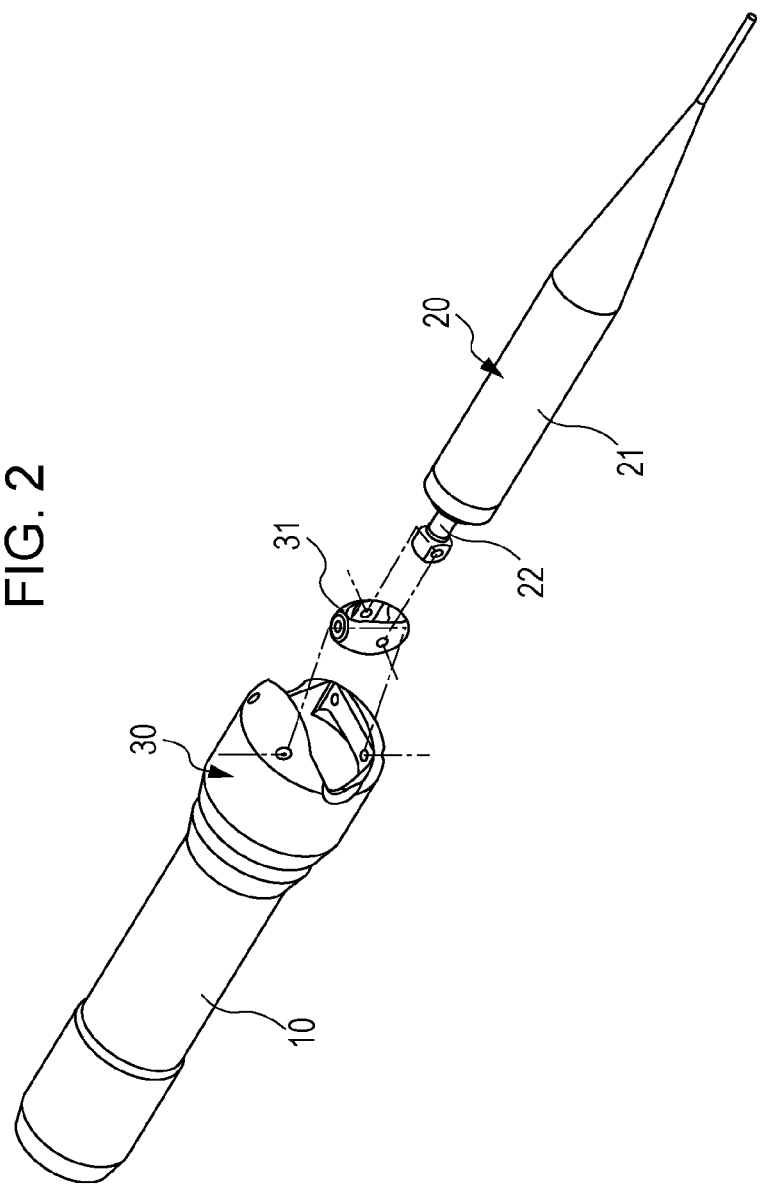
FIG. 2 is an exploded perspective view of the underwater apparatus according to this embodiment.

FIG. 1 is a partial sectional view of an underwater apparatus according to this embodiment. FIG. 2 is an exploded perspective view of the underwater apparatus according to this embodiment. The underwater apparatus illustrated in FIGS. 1 and 2 includes a housing 10, a pair of cable couplings 20, and a connecting holder 30.

The housing 10 is a pressure-resistant container that accommodates devices, such as a power supply and an amplifier. To one end of the housing 10 is connected a cable coupling 40 that connects tail cables 11 extending from the devices in the housing 10 and a main-side submarine cable 40a. The connecting holder 30 described below is connected to the other end of the housing 10.

The cable couplings 20 each include a casing 21 and a gimbal 22. The casings 21 are housings including engaging parts with which branch-side submarine cables 20a are engaged. The casings 21 have a larger diameter than the gimbals 22. The tail cables 11 extending from the devices in the housing 10 pass through the gimbals 22. The tail cables 11 passing through the gimbals 22 are connected to branch-side submarine cables 20a inside the casings 21.

The connecting holder 30 includes gimbal rings 31 that are rotatably fitted to the gimbals 22. The connecting holder 30 connects the pair of cable couplings 20 and the housing 10 so as to be rotatable with respect to each other via the gimbal rings 31.

Figure 3:
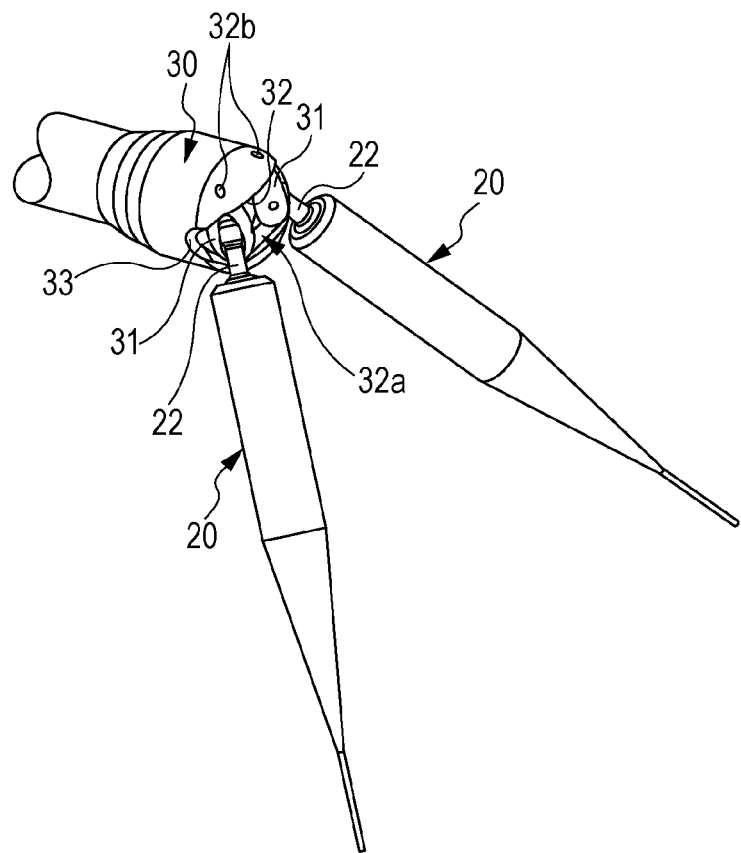
FIG. 3 is a perspective view of a connecting holder as viewed from a pair of cable couplings.

Next, the details of the connecting holder 30 according to this embodiment will be described. FIG. 3 is a perspective view of the connecting holder 30 as viewed from the pair of cable couplings 20. As illustrated in FIG. 3, the connecting holder 30 includes an opening 32 from which the gimbals 22 are introduced toward the gimbal rings 31, and notches 33 provided in the edge of the opening 32.

The opening 32 includes a space 32a in which the tail cables 11 passing through the gimbals 22 may move. In other words, the gimbals 22 and the gimbal rings 31 fitted to the gimbals 22 are accommodated in the space 32a in the opening 32 such that the tail cables 11 passing through the gimbals 22 may move freely. Thus, interference between the tail cables 11 passing through the gimbals 22 and other parts is suppressed.

Furthermore, rotational shafts 32b that rotatably support the gimbal rings 31 fitted to the gimbals 22 are disposed in the opening 32 such that the gimbals 22 move toward the notches 33 in accordance with the rotation of the pair of cable couplings 20. Due to the gimbal rings 31 rotating about the rotational shafts 32b with respect to the connecting holder 30, the gimbals 22 are smoothly guided to the notches 33, and, as a result, the rotation angle of the cable couplings 20 increases.

The notches 33 extend in directions away from the gimbals 22 that move in accordance with the rotation of the cable couplings 20. Therefore, when the gimbals 22 move in accordance with the rotation of the cable couplings 20, the movement of the gimbals 22 is absorbed by the notches 33, whereby the gimbals 22 do not collide with the edge of the opening 32.

The width of the notches 33 gradually decreases as the distance from the gimbals 22, which move in accordance with the rotation of the cable couplings 20, increases. In this embodiment, the notches 33 are substantially V-shaped. Thus, it is possible to limit the rotation of the cable couplings 20 to a predetermined range, improving the ease of transportation of the underwater apparatus.

The surfaces of the gimbal rings 31 that come into contact with the tail cables 11 passing through the gimbals 22 are curved. Thus, the tail cables 11 are smoothly flexed along the curved surfaces of the gimbal rings 31.

Figure 4:
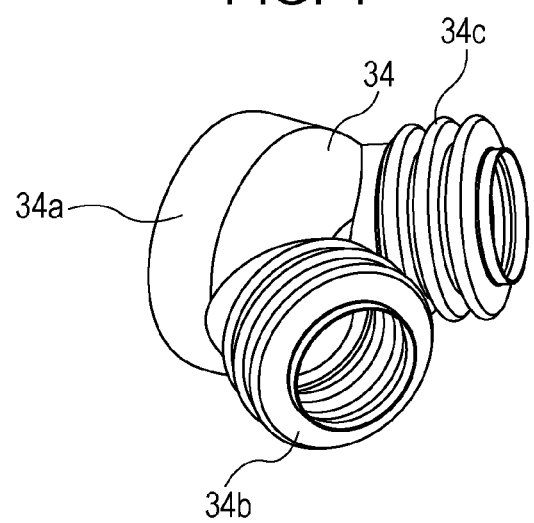
FIG. 4 is a perspective view representing the exterior of a protecting member.

The gimbals 22 of the pair of cable couplings 20 and the opening 32 in the connecting holder 30 are covered by a protecting member 34 formed of an elastic material, as illustrated in FIG. 1. FIG. 4 is a perspective view representing the exterior of the protecting member 34. As illustrated in FIG. 4, the protecting member 34 is bifurcated and includes a first cover portion 34a that covers the gimbal rings 31, and a second cover portion 34b and a third cover portion 34c that are continuous with the first cover portion 34a and cover the gimbals 22. The second cover portion 34b and the third cover portion 34c include bellows structures and are deformed in accordance with the rotation of the pair of cable couplings 20.

Figure 5:
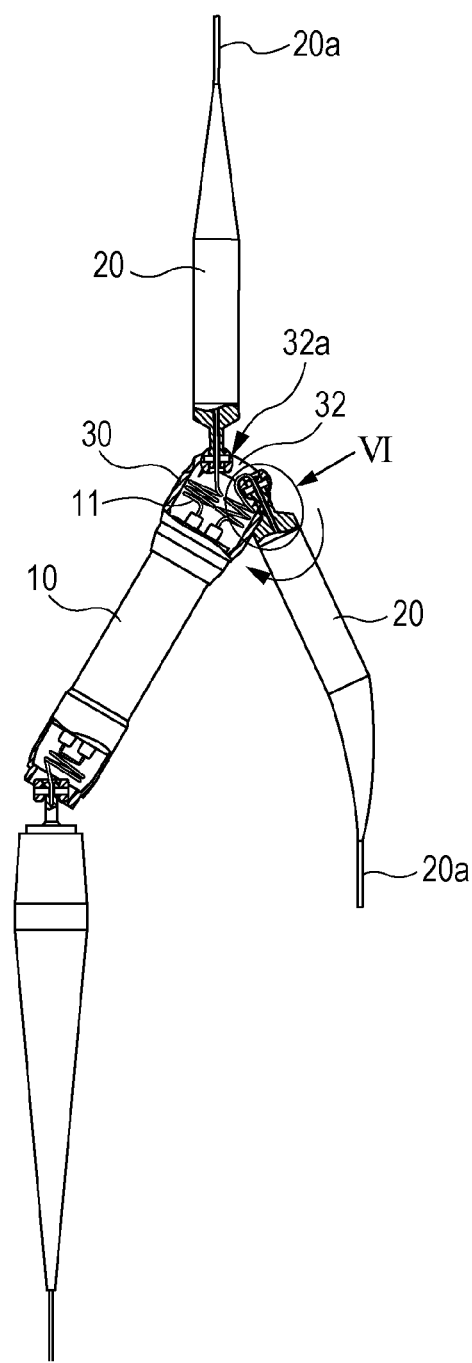
FIG. 5 illustrates the underwater apparatus according to this embodiment while being hoisted.
Figure 6:
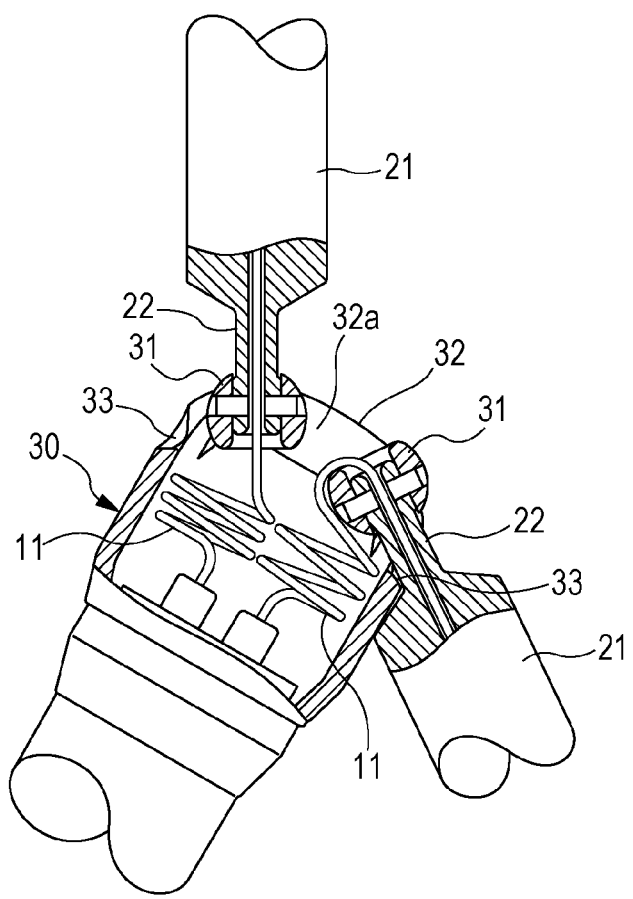
FIG. 6 is an enlarged view of a part VI in FIG. 5.

Next, an operation will be described. FIG. 5 illustrates the underwater apparatus according to this embodiment while being hoisted. FIG. 6 is an enlarged view of a part VI in FIG. 5. FIG. 5 illustrates a case where one of the pair of cable couplings 20 is hoisted when the underwater apparatus is hoisted. At this time, the other cable coupling 20 rotates in the direction indicated by an arrow in FIG. 5 with respect to the housing 10 due to its own weight.

The gimbal 22 of the other cable coupling 20 moves in the space 32a in the opening 32 provided in the connecting holder 30 in accordance with the rotation of the other cable coupling 20 and enters the corresponding notch 33, as illustrated in FIG. 6. At this time, the movement of the gimbal 22 is absorbed by the notch 33, whereby the gimbal 22 does not collide with the edge of the opening 32.

The tail cable 11 passing through the gimbal 22 is in contact with the curved surface of the gimbal ring 31. At this time, the tail cable 11 is smoothly flexed along the curved surface of the gimbal ring 31.

The casing 21 of the other cable coupling 20 comes into contact with the connecting holder 30 when the degree of rotation of the other cable coupling 20 with respect to the housing 10 is maximum. Because the casing 21 of the other cable coupling 20 has a larger diameter than the gimbal 22, the gimbal 22 does not come into contact with the edge of the opening 32 in the connecting holder 30. Accordingly, not the gimbal 22, but the casing 21 may be brought into contact with the connecting holder 30 when the degree of rotation of the other cable coupling 20 increases, and hence, an external force applied from the connecting holder 30 to the gimbal 22 may be excluded.

Figure 10:
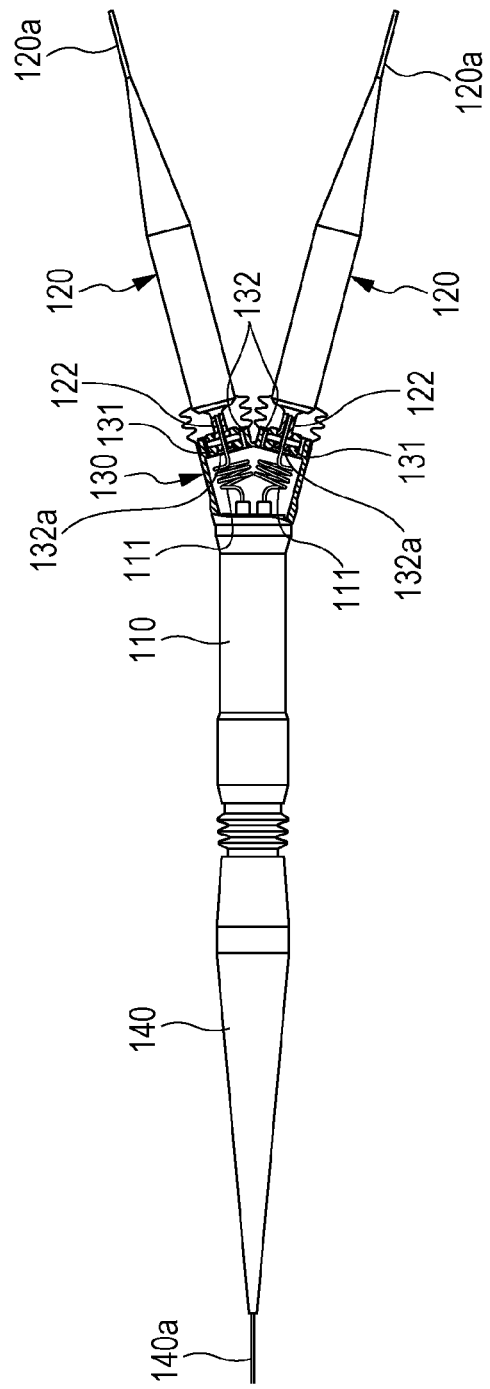
FIG. 10 is a partial sectional view of the related-art underwater apparatus.

By providing the notches 33, which extend in the directions away from the gimbals 22 that move in accordance with the rotation of the cable couplings 20, in the edge of the opening 32 in the connecting holder 30, the degree of rotation of the cable couplings 20 may be increased. With this configuration, it is possible to reduce the stress component in the rotation direction acting on the cable couplings 20, compared with the related-art underwater apparatus illustrated in FIG. 10.

Figure 7:
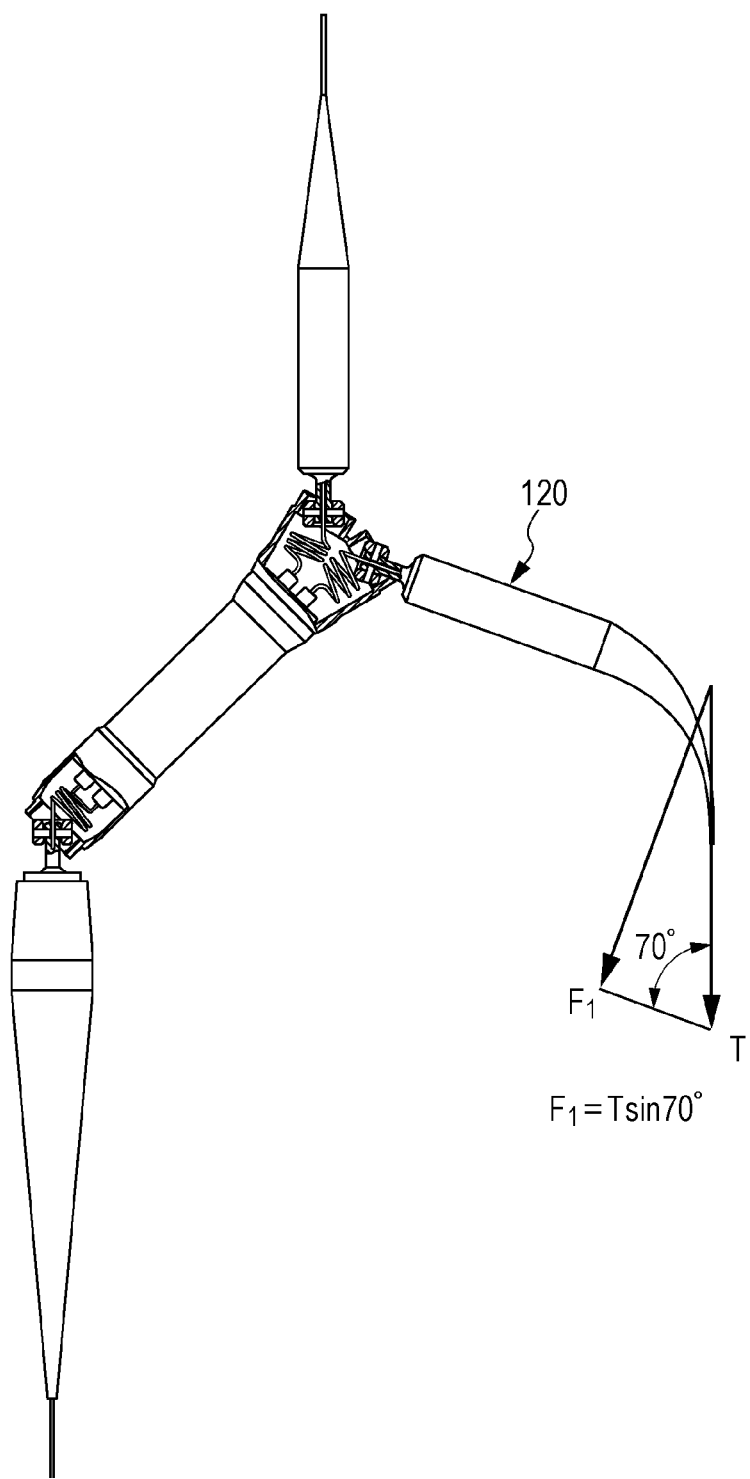
FIG. 7 illustrates a stress component in a rotation direction acting on a cable coupling of a related-art underwater apparatus.
Figure 8:
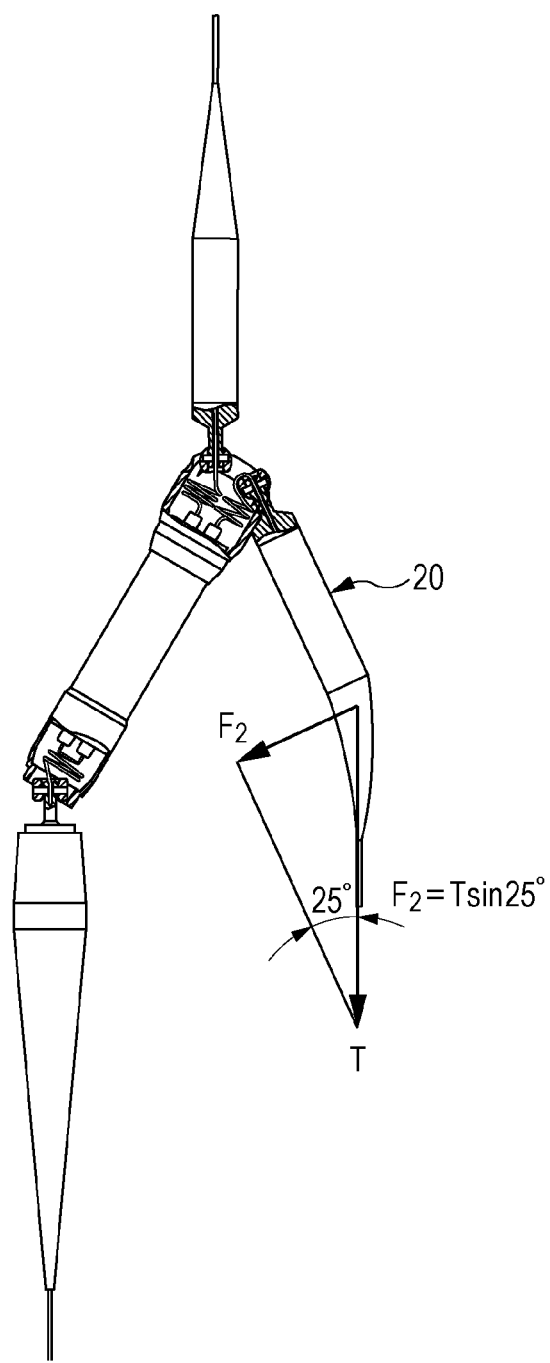
FIG. 8 illustrates a stress component in the rotation direction acting on the cable coupling of the underwater apparatus according to this embodiment.

FIG. 7 illustrates a stress component in the rotation direction acting on the cable coupling 120 of the related-art underwater apparatus. FIG. 8 illustrates a stress component in the rotation direction acting on the cable coupling 20 of the underwater apparatus according to this embodiment. It is assumed that the cable coupling 20 and the cable coupling 120 are subjected to the same tension T.

In FIG. 7, a stress F1 in the rotation direction acting on the cable coupling 120 of the related-art underwater apparatus is expressed by Expression (1).

$$F1 = T \sin 70° \qquad (1)$$

In FIG. 8, a stress F2 in the rotation direction acting on the cable coupling 20 of the underwater apparatus according to this embodiment is expressed by Expression (2).

$$F2 = T \sin 25° \qquad (2)$$

Expression (3) results from Expressions (1) and (2).

$$F2/F1 = 1/2.2 \qquad (3)$$

Expression (3) indicates that the stress component in the rotation direction acting on the cable coupling 20 may be reduced to 1/2.2 times that of the related-art underwater apparatus by increasing the degree of rotation of the cable coupling 20.

As has been described above, in the underwater apparatus according to this embodiment, the notches 33, which extend in the directions away from the gimbals 22 that move in accordance with the rotation of the cable couplings 20, are provided in the edge of the opening 32 in the connecting holder 30. This increases the degree of rotation of the cable couplings 20 with respect to the housing 10, whereby the other gimbal 22 is not damaged even when one of the pair of cable couplings 20 is hoisted. As a result, the gimbals of the cable couplings are not damaged when the underwater apparatus is hoisted.

Furthermore, in the underwater apparatus according to this embodiment, the opening 32 in the connecting holder 30 includes the space 32a in which the tail cables 11 passing through the gimbals 22 may move. Thus, interference between the tail cables 11 passing through the gimbals 22 and other parts is suppressed, and damage to the tail cables 11 may be avoided.

Furthermore, in the underwater apparatus according to this embodiment, the width of the notches 33 gradually decreases as the distance from the gimbals 22, which move in accordance with the rotation of the cable couplings 20, increases. Thus, it is possible to limit the rotation of the cable couplings 20 to a predetermined range, improving the ease of transportation.

Furthermore, in the underwater apparatus according to this embodiment, the cable couplings 20 includes the casings 21 having a larger diameter than the gimbals 22. The casings 21 come into contact with the connecting holder 30 when the degree of rotation of the cable couplings 20 with respect to the housing 10 is maximum. Accordingly, not the gimbal 22, but the casing 21 may be brought into contact with the connecting holder 30 when the degree of rotation of the cable couplings 20 increases, and hence, an external force applied from the connecting holder 30 to the gimbal 22 may be excluded. As a result, damages to the gimbals 22 and the cables passing through the gimbals 22 may be avoided.

Furthermore, in the underwater apparatus according to this embodiment, the connecting holder 30 includes the rotational shafts 32b that rotatably support the gimbal rings 31 such that the gimbals 22 move toward the notches 33 in accordance with the rotation of the pair of cable couplings 20. Accordingly, the gimbals 22 may be smoothly guided to the notches 33.

Furthermore, in the underwater apparatus according to this embodiment, the surfaces of the gimbal rings 31 that come into contact with the tail cables 11 passing through the gimbals 22 are curved. Thus, the tail cables 11 may be smoothly flexed along the curved surfaces of the gimbal rings 31, when the cable couplings 20 rotate with respect to the housing 10. As a result, bending of the tail cables 11 may be avoided.

Furthermore, in the underwater apparatus according to this embodiment, the gimbals 22 of the pair of cable couplings 20 and the opening 32 in the connecting holder 30 are covered by the bifurcated protecting member 34. Thus, entry of foreign matter into gaps between the gimbals 22 of the pair of cable couplings 20 and the opening 32 in the connecting holder 30 may be suppressed.

Figure 9:
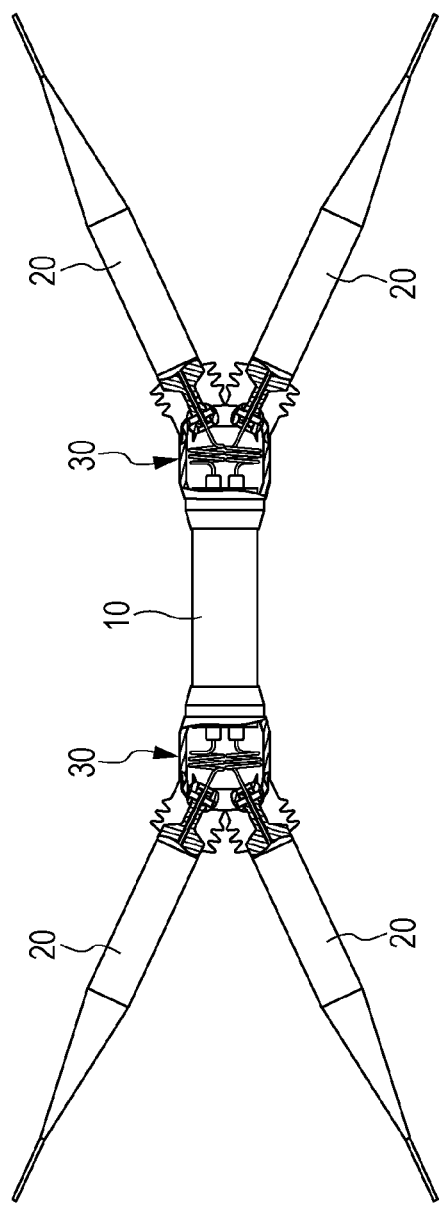
FIG. 9 is a partial sectional view of an underwater apparatus according to a modification.

In the above-described embodiment, a case is described where one cable coupling 40 that connects the main-side submarine cable 40a and the tail cables extending from the devices in the housing 10 is connected to one end of the housing 10, and the connecting holder 30 is connected to the other end of the housing 10. However, the component connected to the one end of the housing 10 is not limited to the cable coupling 40. For example, as illustrated in FIG. 9, the connecting holder 30 may be connected to the one end of the housing 10, similarly to the other end of the housing 10. FIG. 9 is a partial sectional view of an underwater apparatus according to a modification.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An underwater apparatus comprising:
   a housing configured to accommodate a certain device;
   a pair of cable couplings configured to include gimbals through which tail cables extending from the device to the outside of the housing pass, and the pair of cable couplings that connect the tail cables passing through the gimbals to a submarine cable; and
   a connecting holder configured to include gimbal rings fitted to the gimbals and to connect the pair of cable couplings to the housing via the gimbal rings so that the pair of cable coupling is rotatable relative to the housing, the connecting holder including an opening from which the gimbals are introduced toward the gimbal rings, wherein the connecting holder includes notches provided in an edge of the opening and the notches are formed by retreating the edge of the opening in directions away from the gimbals so that the pair of cable coupling is rotatable relative to the housing.

2. The underwater apparatus according to claim 1, wherein the opening includes a space that allows the tail cables passing through the gimbals to move.

3. The underwater apparatus according to claim 1, wherein the width of each of the notches gradually decreases as the distance from the gimbals that move in accordance with the rotation of the pair of cable couplings increases.

4. The underwater apparatus according to claim 1,
   wherein each of the cable couplings includes casing having a larger diameter than each of the gimbals, and
   wherein the casings come into contact with the connecting holder when the degree of rotation of the cable couplings with respect to the housing is maximum.

5. The underwater apparatus according to claim 1,
   wherein the connecting holder includes rotational shafts that rotatably support the gimbal rings fitted to the gimbals such that the gimbals move toward the notches in accordance with the rotation of the pair of cable couplings.

6. The underwater apparatus according to claim 1,
   wherein surfaces of the gimbal rings that come into contact with the tail cables passing through the gimbals are curved.

7. The underwater apparatus according to claim 1,
   wherein the gimbals of the pair of cable couplings and the opening in the connecting holder are covered by a bifurcated protecting member.

* * * * *